US008828592B2

United States Patent
Koh et al.

(10) Patent No.: US 8,828,592 B2
(45) Date of Patent: Sep. 9, 2014

(54) BATTERY PACK (75) Inventors: Seok Koh, Yongin-si (KR); Jeongdeok Byun, Yongin-si (KR); Kyungho Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1071 days.

(21) Appl. No.: 12/466,232

(22) Filed: May 14, 2009

(65) Prior Publication Data

US 2009/0305117 A1 Dec. 10, 2009

(30) Foreign Application Priority Data

Jun. 5, 2008 (KR) .................. 10-2008-0053203

(51) Int. Cl.
*H01M 10/42* (2006.01)

(52) U.S. Cl.
USPC ........................................ 429/163

(58) Field of Classification Search
CPC .............................. H01M 2/34; H01M 10/425
USPC .................................. 429/96, 163
See application file for complete search history.

(56) References Cited

U.S. PATENT DOCUMENTS

2008/0233472 A1* 9/2008 Ota et al. ...................... 429/122

FOREIGN PATENT DOCUMENTS

| JP | 2006-147193 | | 6/2006 |
| JP | 2006-164531 | | 6/2006 |
| JP | 2006147193 A | * | 6/2006 |
| JP | 2007-273375 | | 10/2007 |
| KR | 10-2006-0032591 | | 4/2006 |
| KR | 1020060098988 A | | 9/2006 |
| WO | WO 2006046343 A1 | * | 5/2006 |

OTHER PUBLICATIONS

Machine translation of JP 2007-273375, which was provided in Japanese by the applicant (IDS Jul. 13, 2010).*

* cited by examiner

*Primary Examiner* — Alison Hindenlang
(74) *Attorney, Agent, or Firm* — Christie, Parker & Hale, LLP (57) ABSTRACT

A battery pack includes a bare cell having a coupling groove and a protection circuit electrically coupled to the bare cell. A coupler has a first end attached to the protection circuit and a second end defining a coupling hole, the second end contacting the bare cell. A fastener is combined to the coupling groove through the coupling hole; wherein the coupler includes an elastic region for elastically supporting the fastener and the bare cell.

18 Claims, 10 Drawing Sheets

BATTERY PACK

CROSS-REFERENCE TO RELATED APPLICATION

This application claims priority to and the benefit of Korean Patent Application No. 10-2008-0053203, filed on Jun. 5, 2008, in the Korean Intellectual Property Office (KIPO), the entire content of which is hereby incorporated by reference.

BACKGROUND OF THE INVENTION

1. Field of the Invention

The present invention relates to a battery pack.

2. Description of the Related Art

Recently, compact and lightweight portable electrical/electronic devices such as cellular phones, notebook computers, camcorders and the others have been widely developed and manufactured. These portable electrical/electronic devices are equipped with a battery pack so as to be operated without an additional power source. A battery pack typically uses a rechargeable secondary battery so as to be more economical. The secondary battery may be, for example, a nickel-cadmium (Ni—Cd) battery, a nickel-metal hybrid (Ni-MH) battery, a lithium (Li) battery and a lithium-ion (Li-ion) secondary battery. Particularly, Li-ion secondary batteries have an operation voltage about three times higher than Ni—Cd batteries or Ni-MH batteries typically used to power portable electronic equipment. In addition, Li-ion secondary batteries are widely used because they have a high energy density per unit weight.

The secondary battery primarily uses a lithium-based oxide as a cathode active material and carbon materials as an anode active material. Generally, secondary batteries are classified into a liquid electrolyte battery and a polymer electrolyte battery according to a kind of electrolyte used therein. A battery using a liquid electrolyte is referred to as a lithium-ion battery and a battery using a polymer electrolyte is referred to as a lithium-polymer battery.

The secondary battery may be formed by electrically coupling a bare cell to a protection circuit. The bare cell is formed by sealing a can containing an electrode assembly and electrolyte. The bare cell is charged and discharged through a chemical reaction and the protection circuit controls charge/discharge of the bare cell. Accordingly, the bare cell is protected from over-charge and over-discharge by the protection circuit.

Typically in a secondary battery, the bare cell is electrically coupled to the protection circuit to reduce electrical resistance between the bare cell and the protection circuit, and thus charge/discharge efficiency of the bare cell is increased. In other words, when the electrical resistance between the bare cell and the protection circuit increases, the charge/discharge efficiency of the bare cell is reduced.

The secondary battery is assembled into a battery pack by integrating the bare cell with the protection circuit so as to be configured to be installed on an electronic device, and then a reliability test is performed to estimate stability due to impact. It has been found that the electrical resistance between the bare cell and the protection circuit in the battery pack increases upon external impact. The increase in electrical resistance may be due to an increase in contact resistance between the bare cell and the protection circuit caused by separation of the bare cell from the protection circuit due to the external impact.

SUMMARY OF THE INVENTION

According to one aspect of the present invention, a battery pack is provided that can substantially prevent an increase in contact resistance upon external impact applied to a bare cell and a protection circuit.

According to another aspect of the present invention, a battery pack is provided having an improved assembly efficiency.

Additional aspects of the invention will be set forth in part in the description that follows.

A battery pack includes a bare cell having a coupling groove and a protection circuit electrically coupled to the bare cell. A coupler has a first end attached to the protection circuit and a second end defining a coupling hole, the second end contacting the bare cell. A fastener is combined to the coupling groove through the coupling hole; wherein the coupler includes an elastic region for elastically supporting the fastener and the bare cell.

In one embodiment, the elastic region extends at an acute angle from a plane defined by the coupling hole, and the elastic region may be divided into a first elastic region and a second elastic region by a slit extending from the coupling hole, the first elastic region extending generally toward the protection circuit and the second elastic region extending generally away from the protection circuit.

In one embodiment, an opening of the coupling groove defines a burr prevention region having a diameter greater than a diameter of the coupling groove. The diameter of the burr prevention region may be from about 10% to 30% greater than the diameter of the coupling groove and may be defined by a chamfered portion of the coupling groove.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Hereinafter, embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are provided to assist those of ordinary skill in the art in a comprehensive understanding of the invention, and the present invention is defined within the scope of the appended claims. In the description of the present invention, the same drawing reference numerals are used for the same elements across various figures.

Figure 1A:
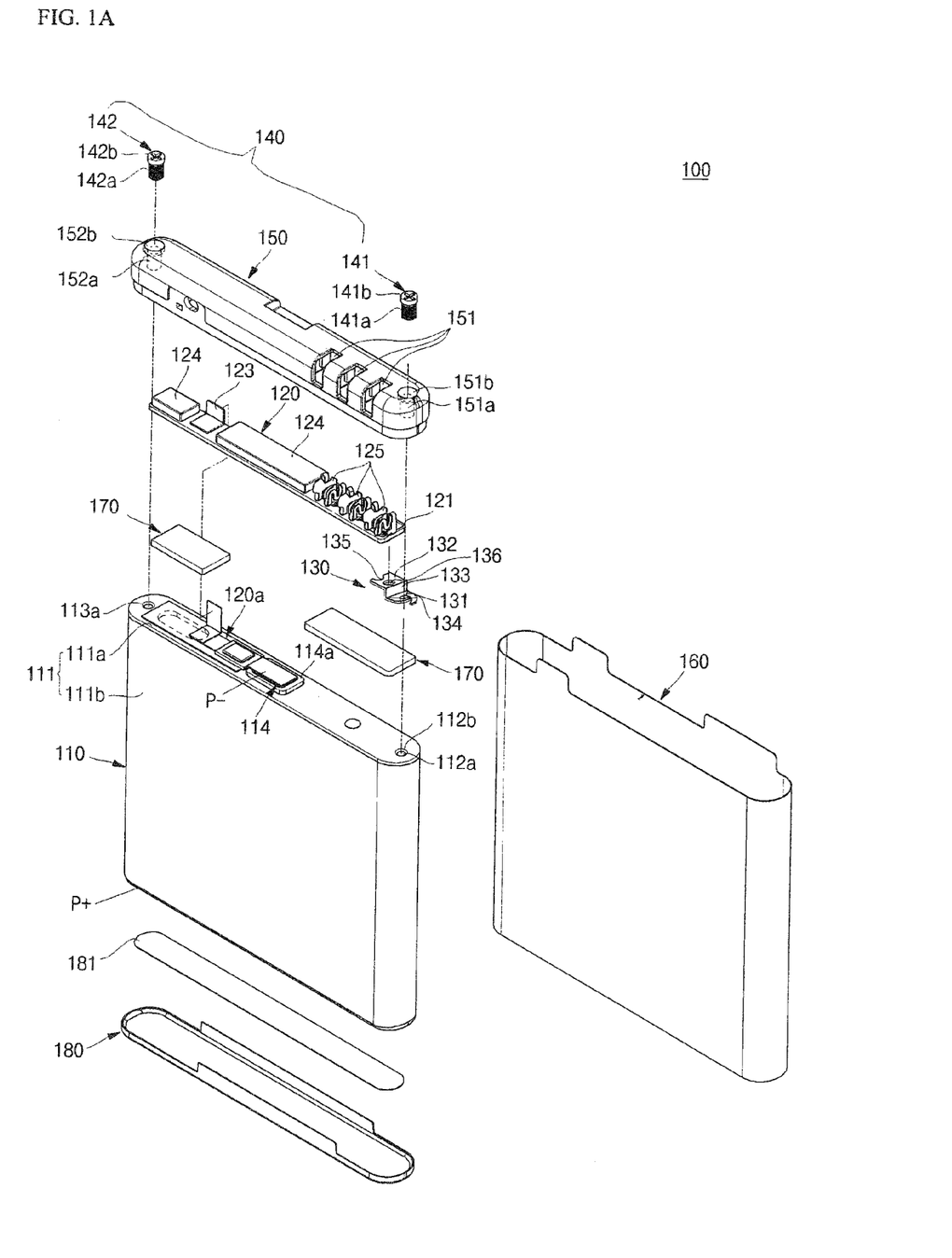
FIG. 1A is an exploded perspective view illustrating a battery pack according to one embodiment of the present invention.
Figure 1B:
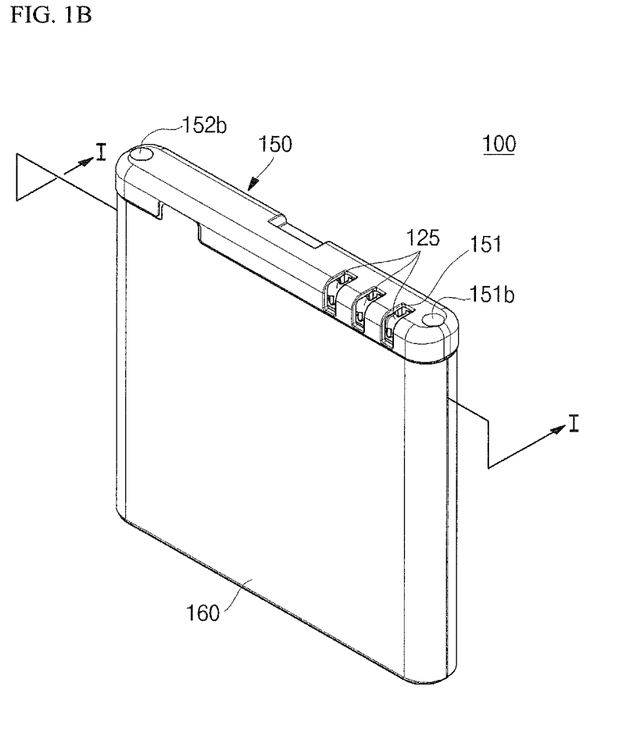
FIG. 1B is an assembled perspective view of the battery pack of FIG. 1A.

With reference now generally to FIGS. 1A-1F, and specifically to FIG. 1A, a battery pack 100 according to one embodiment of the present invention includes a bare cell 110 and a protection circuit 120, a coupler 130 and a fastener 140. The battery pack 100 further includes a cover 150, a label 160, an elastic pad 170, and a supplementary case 180.

According to the embodiment, and as described in more detail below, the fastener 140 includes a first fastener 141 and a second fastener 142. First and second coupling grooves 112a, 113a are formed in the bare cell 110 for receiving the first and second fasteners 141, 142, respectively. Further, first and second through holes 151a, 152a are formed on the cover 150, and first and second seating grooves 151b, 152b are formed in an outer edge of the first and second through holes 151a, 152a.

The bare cell 110 is a can-type battery having a cathode (P+) and an anode (P−). The bare cell 110 is provided with the first coupling groove 112a and the second coupling groove 113a formed on either side of one surface of an outer edge of the bare cell. The first fastener 141 is combined with the first coupling groove 112a and the second fastener 142 is combined with the second coupling groove 113a. In addition, a thread on the first fastener 141 and on the second fastener 142 may form a groove on an inner circumferential surface of the first and second coupling grooves 112a, 113a upon insertion of the fasteners into the respective coupling grooves.

Figure 1C:
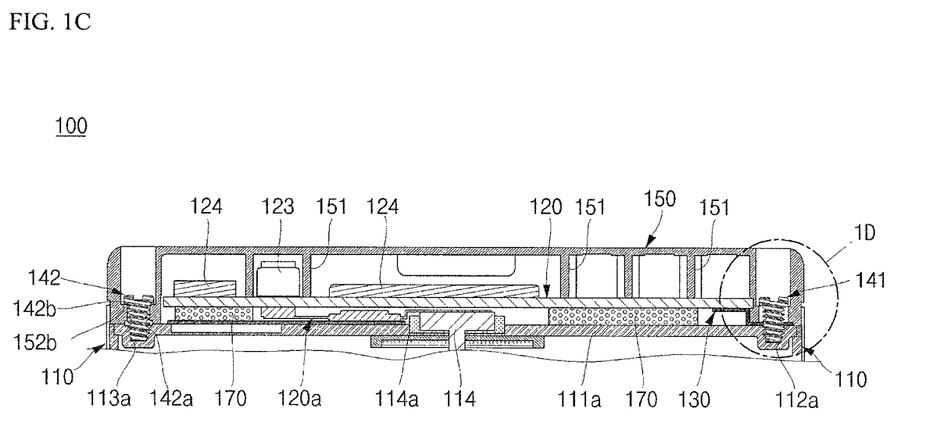
FIG. 1C is a partial cross-sectional view taken along 'I-I' line of the battery pack of FIG. 1B.

The bare cell 110 is a can-type battery formed by sealing an electrode assembly (not shown) with a sealing assembly 111 made of a metal material such as aluminum, wherein the electrode assembly is formed by winding a cathode plate, an anode plate, and a separator, as generally known in the art. The first and second coupling grooves 112a, 113a may be formed in the sealing assembly made of a metal material. The sealing assembly 111 may include a metal-type can 111b having one opened end portion and a cap plate 111a enclosing the opened end portion of the can 111b. In addition, an electrode terminal 114 may be insulated by an insulator 114a and installed in the metal-type can 111b and/or the cap plate 111a. Referring to FIGS. 1A and 1C, the electrode terminal is insulated by the insulator 114a and inserted onto the cap plate 111a. As such, a cathode of the bare cell 110 may be electrically coupled to the sealing assembly 111 and an anode of the bare cell 110 may be electrically coupled to the electrode terminal 114. The electrode terminal 114 and the sealing assembly 111 may have opposite polarities from each other. In other words, the bare cell 110 may be a can-type battery formed by sealing the electrode assembly with the sealing assembly 111 made of a metal material, electrically coupling one of the polarities of the electrode assembly to the sealing assembly 111 and electrically coupling the other to the electrode terminal 114. According to the exemplary embodiment, an anode is formed by electrically coupling the electrode terminal 114 to an anode plate of the electrode assembly and a cathode is formed by electrically coupling the sealing assembly 111 to a cathode plate.

Figure 1D:
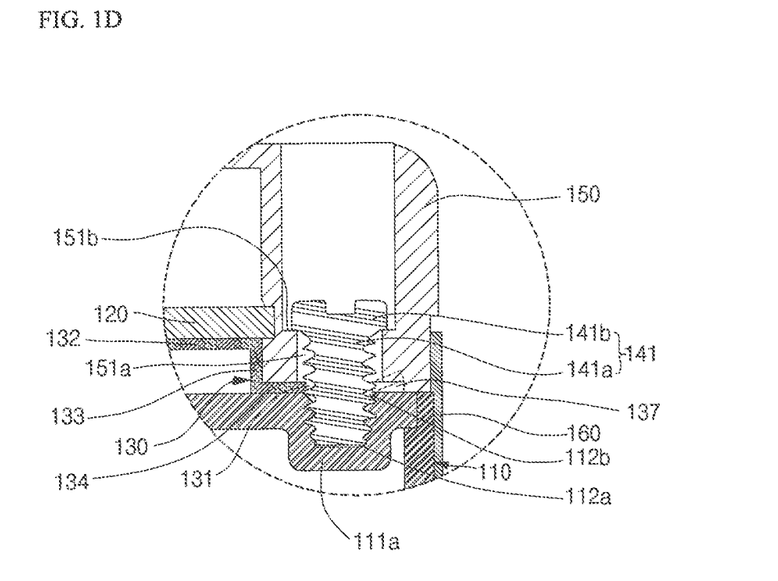
FIG. 1D is a detailed cross-sectional view illustrating region 1D of FIG. 1C.
Figure 1E:
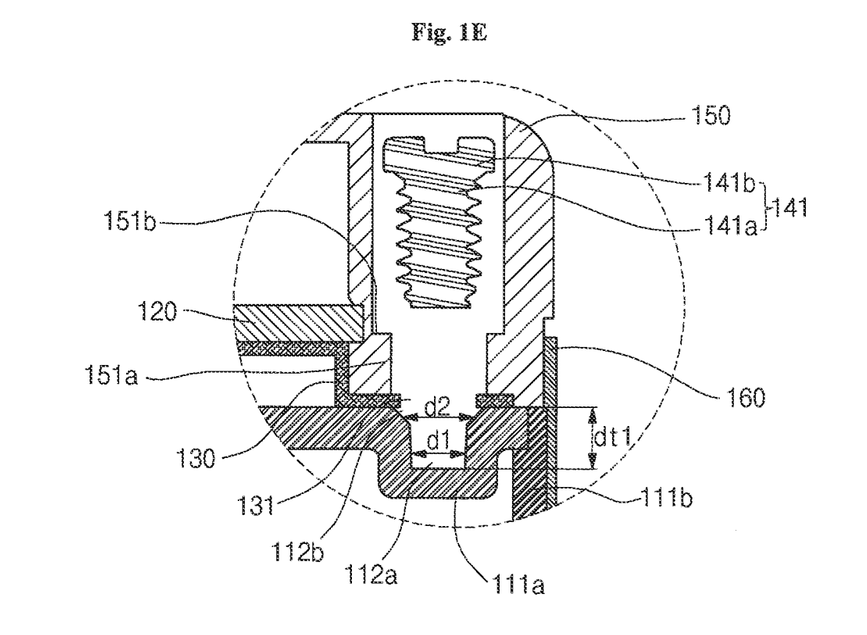
FIG. 1E is a cross-sectional view illustrating a disengaged fastener of FIG. 1D.

With reference also to FIG. 1E, in an opening of the first and second coupling grooves 112a, 113a formed in the bare cell 110, a burr prevention region 112b is formed having a diameter larger than a diameter of the first and second coupling grooves 112a, 113a.

A burr is a region formed when a body 141a raises an interior circumferential surface of the coupling groove 112a upon insertion into the first coupling groove 112a, thereby plastically deforming a circumference of the first coupling groove 112a. A contact area between the coupler 130 and the bare cell 110 and a coupling strength between the coupler 130 and the bare cell 110 are reduced by the burr. Accordingly, contact resistance of the bare cell 110 and the coupler may be increased upon external impact.

Accordingly, the burr prevention region 112b is formed in an outer edge portion of the first coupling groove 112a and has a diameter larger than that of the first coupling groove 112a. In other words, the burr prevention region 112b prevents generation of burr (a raised edge). Accordingly, even though external impact may be applied to the bare cell 110 and the protection circuit 120, the increase in contact resistance of the bare cell 110 and the coupler 130 may be prevented or significantly reduced.

In one embodiment, the burr prevention region 112b is formed by chamfering an upper edge portion of the first coupling groove 112a. The shape of chamfer may be, for example, round or rectangular.

Referring to FIG. 1E, the diameter d2 of the burr prevention region 112b is from about 10% to 30% greater than a diameter d1 of the first coupling groove 112a. If the diameter d2 of the burr prevention region 112b is less than 10% greater than the diameter d1 of the first coupling groove 112a, burr is likely to be generated around the first coupling groove 112a, and thus contact resistance between the coupler 130 and the bare cell 110 may be increased. In addition, when the diameter d2 of the burr prevention region 112b is greater than 30% of the diameter d1 of the first coupling groove 112a, generation of the burr formed around the first coupling groove 112a is prevented. However, a contact area between the coupler 130 and the bare cell 110 is reduced and thus contact resistance of the coupler 130 and the bare cell 110 is increased. Accordingly, the diameter d2 of the burr prevention region 112b is formed to be from about 10% to 30% larger than the diameter d1 of the first coupling groove 112a to thereby maintain the contact resistance of the coupler 130 and the bare cell 110 at a suitable value.

In addition, the diameter d1 of the first coupling groove 112a formed in the bare cell 110 may be narrow along a depth dt1 of the groove 112a. As such, a coupling strength of the first fastener 141 to the bare cell 110 may be improved. More specifically, when the fastener 141 is inserted through the coupling hole 131 of the coupler 130 to be combined to the first coupling groove 112a of the bare cell 110, the diameter d1 being smaller in a deeper portion of the first coupling groove 112a formed in the bare cell 110 allows the fastener to be more securely held within the groove, thereby improving a coupling strength of the fastener 141 to the first coupling groove 112a. In addition, a shallower portion of the first coupling groove 112a formed in the bare cell 110 is wider than a deeper portion thereof, and thus generation of burr is substantially prevented. As noted above, the burr prevention region 112b having a diameter d2 larger than the diameter d1 of the first coupling groove 112a is formed in the opening of the first coupling groove 112a, and thus generation of burr may be substantially prevented. Accordingly, in the battery pack 200, the coupling of the fastener 141 to the first coupling groove 112a is improved and the generation of burr is prevented or significantly reduced, and thus an increase in contact resistance is prevented or significantly reduced when external impact is applied to the battery pack 200.

The protection circuit 120 is electrically coupled to the bare cell 110. In the electrical coupling of the protection circuit 120 to the bare cell 110, an anode of the protection circuit 120 is coupled to the electrode terminal 114 by a lead tab 120a, and a cathode of the protection circuit 120 may be electrically coupled to the sealing assembly 111 by the coupler 130. A positive temperature coefficient (PTC) element120a is electrically coupled between the anode of the protection circuit 120 and the electrode terminal 114, and such electrical coupling of the anode of the protection circuit 120 and the electrode terminal 114 may be interrupted or severed when temperature is excessively increased or over-current flows. In addition, the protection circuit 120 includes an insulation substrate 121, a printed circuit pattern (not shown), a conductive pad 123, a protection circuit module 124 and a charge/discharge terminal 125. The conductive pad 123, the protection circuit module 124 and the charge/discharge terminal 125 may be soldered to the printed circuit pattern formed on the insulation substrate 121. In the protection circuit module 124, a passive element such as resistance and a condenser, an active element such as a FET (field effect transistor), a safety element such as a PCT element and integrated circuits may be included if desired. In addition, the protection circuit module 124 charges or discharges the battery pack 100 with the bare cell 110, and a charge/discharge path of the bare cell 110 is severed when overheating occurs or over-current is generated in the bare cell 110. Accordingly, degradation, over-heating and explosion of the bare cell 110 may be prevented or significantly reduced by the protection circuit module.

Figure 1F:
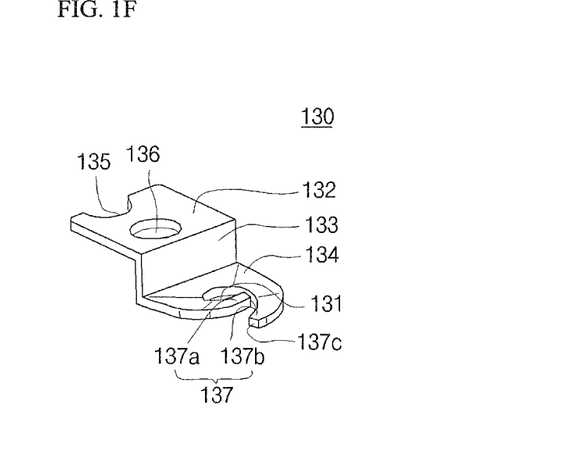
FIG. 1F is a perspective view illustrating a coupler according to an embodiment of the present invention.

With reference now also to FIG. 1F, the coupler 130 may include a first region 132, a second region 133 and a third region 134. The coupler 130 may electrically couple the protection circuit 120 to the bare cell 110 while simultaneously supporting the protection circuit 120 and the bare cell 110. The coupler 130 may be formed of nickel or nickel-containing alloy and thus coupling and conductivity is improved due to soldering with the protection circuit 120.

The first region 132 is connected to a lower surface of the protection circuit 120. In addition, a solder (not shown) is formed around a portion where the first region 132 and the protection circuit 120 are connected to each other.

In one embodiment, a soldering notch 135 is formed at a side of the first region 132. The soldering notch 135 provides a space into which the solder flows and pools, and thus the coupling strength of the coupler 130 to the protection circuit 120 is improved by soldering. Accordingly, the increase in resistance between the coupler 130 and the protection circuit 120 is prevented or significantly reduced even when external impact is applied. In addition, when the coupler 130 is mounted on the protection circuit 120 by a surface mounting technology (SMT) process, the soldering notch 135 provides a space contacting mounting equipment and prevents or significantly reduces the coupler 130 from being distorted on the protection circuit 120 by external impact.

In addition, a soldering hole 136 may be defined in the first region 132. The soldering hole 136 provides a space into which the solder flows and pools, similarly to the soldering notch 135. Accordingly, the coupling strength of the coupler 130 to the protection circuit 120 is improved by soldering, thereby substantially preventing an increase in resistance between the coupler 130 and the protection circuit 120 upon external impact of the battery pack.

The second region 133 is formed by being bent from the first region 132, and more specifically, by being bent approximately perpendicular to an edge of the first region 132.

A coupling hole 131 is defined by the third region 134, the third region being bent from the second region 133 to extend in a direction away from the first region 132. Accordingly, the first region 132 and the third region 134 of the coupler 130 may be generally horizontal to one surface of the protection circuit 120 and the bare cell 110.

In addition, referring to FIG. 1D, an elastic region 137 is formed in the third region 134. The elastic region 137 applies a force on the bare cell 110 and the cover 150, and the cover 150 in turn applies a force to a head 141b of the first fastener 141. Accordingly, the elastic region 137 elastically supports a region between the first fastener 141 and the bare cell 110 and thus the coupling strength of the first fastener 141 is increased. As a result thereof, the increase in contact resistance between the bare cell 110 and the protection circuit 120 is prevented or significantly reduced upon external impact. As described in more detail below, a portion of the third region 134 may be projected or bent to form the elastic region 137.

According to the present embodiment, referring to FIG. 1F, the elastic region 137 may be formed in a shape of a spring washer. A slit 137c may be formed in the elastic region 137, the slit 137c formed by cutting one portion of the coupler 130 from an outer edge of the coupler 130 to the coupling hole 131. One end of the elastic region 137 divided by the slit 137c is bent upward toward the protection circuit to form an upper elastic region 137a in the coupler 130. In addition, the other end of the elastic region 137 divided by the slit 137c is bent downward away from the protection circuit to further form a lower elastic region 137b in the coupler 130. The upper elastic region 137a pushes the cover 150 against the first fastener 141 to improve coupling strength of the first fastener 141 to the bare cell 110. In other words, the upper elastic region 137a improves the coupling force between a body of the first fastener 141 and the bare cell 110. In addition, the lower elastic region 137b pushes the bare cell 110 laterally outward to improve the coupling strength of the coupler 130 to the bare cell 110. According to the present embodiment, the upper and lower elastic regions 137a, 137b are both bent in the coupler 130, but in another embodiment, only one of the upper and lower elastic regions 137a, 137b may be bent.

The elastic region 137 supports the bare cell 110 and the cover 150 elastically. Accordingly, coupling of the bare cell 110 to the first fastener 141 is improved and thus the coupler 130 is pressed to the bare cell 110. Accordingly, the increase in the contact resistance of the bare cell 110 and the coupler 130 is prevented or significantly reduced even upon external impact of the battery pack.

The first fastener 141 is combined to the first coupling groove 112a of the bare cell 110 through the coupling hole 131 formed in the coupler 130 and the second fastener 142 is combined to the second coupling groove 113a of the bare cell 110. In addition, the fasteners 141, 142 include bodies 141a, 142a and heads 141b, 142b, respectively. In addition, bodies 141a, 142a of the fasteners 141, 142 are provided with a thread for attaching the fasteners to the coupling grooves 112a, 113a of the bare cell 110. The heads 141b, 142b of the fasteners 141, 142 are formed on the bodies 141a, 142a and have a greater diameter than the bodies 141a, 142a. In addition, the heads 141b, 142b may contain a groove such as '−' and '*' in addition to a '+' to allow a screwdriver to be used on the fasteners. Specifically, the screw drivers are inserted into the groove in the heads 141b, 142b of the fasteners 141, 142, and thus the fasteners 141, 142 may be attached to the coupling grooves 112a, 113a of the bare cell 110.

The first and second fasteners 141, 142 are combined with the first and second coupling grooves 112a, 113a formed on either side of the bare cell 110 to prevent or significantly reduce the protection circuit 120 from being distorted and to improve a coupling strength of the coupler 130 soldered to the protection circuit 120. Accordingly, an increase in the contact resistance between the coupler 130 and the bare cell 110 may be prevented or significantly reduced upon external impact.

The cover 150 surrounds the protection circuit 120, and the first and second seating grooves 151b, 152b are formed into the cover 150. Here, first and second screw through holes 151a, 152a are defined by the seating grooves 151b, 152b. The body 141a of the first fastener 141 is passed through the first screw through hole 151a and the head 141b of the first fastener 141 is pressed to the first seating groove 151b. In addition, the body 142a of the second fastener 142 is passed through the second screw through hole 152a and the head 142b of the second fastener 142 is pressed to the second seating groove 152b. Accordingly, the first and second fasteners 141, 142 suitably fix the cover 150 to the bare cell 110 and the protection circuit 120.

The cover 150 is a plastic case formed by injection molding a resin material such as polycarbonate. The cover 150 protects the protection circuit 120 from external impact and prevents a short circuit of the protection circuit 120.

In addition, the cover 150 is provided with a charge/discharge terminal hole 151. The charge/discharge terminal hole 151 may be exposed to an exterior of the battery pack by the charge/discharge terminal hole 151 formed on the cover 150.

With reference to FIG. 1C, a plurality of ribs 151 are formed inside the cover 150. The ribs 151 support an upper surface of the protection circuit 120 and thus may prevent the protection circuit 120 from being pressed to the bare cell 110.

With reference again to FIG. 1D, the elastic region 137 of the coupler 130 causes the coupler 130 to be pressed to or forced against the bare cell 110. Accordingly, a coupling force between the coupler 130 and the bare cell 110 is strengthened, thereby preventing or significantly reducing an increase in contact resistance upon external impact of the battery pack.

The label 160 surrounds the bare cell 110 and the cover 150. In one embodiment, the label 160 may be bonded to the bare cell 110 and the cover 150 by a bonding agent. In addition, the label 160 may be printed with information such as volume and product number of the battery pack 100 on an outer surface of the label 160. The label 160 combines the bare cell 110 to the cover 150, thus substantially preventing relative movement between the cover 150 and the coupler 130 upon external impact of the battery pack. Accordingly, the label 160 substantially prevents an increase of contact resistance between the coupler 130 and the bare cell 110 upon external impact.

With reference again to FIG. 1C, the elastic pad 170 is located between the protection circuit 120 and the bare cell 110. The elastic pad 170 may be formed of, for example, silicon, rubber or foam tape made of a porous material. The elastic pad 170 may be formed on either side of the protection circuit module 124 between the bare cell 110 and the protection circuit 120. The elastic pad 170 absorbs external impact by supporting the coupler 130 and the bare cell 110, and thus the increase in contact resistance between the coupler 130 and the bare cell 110 is prevented or minimized. In addition, the elastic pad 170 is seated on the bare cell 110 and provides a resilient cushion for the protection circuit 120. Accordingly, the coupler 130 soldered to the protection circuit 120 pushes the elastic support member 160 upward and thus coupling is improved. Thus, the uncoupling of the fasteners 141, 142 is substantially prevented, thus substantially preventing an increase in the contact resistance between the coupler 130 and the bare cell 110 upon external impact of the battery pack.

The supplementary case 180 surrounds an edge of the bare cell 110 and thus substantially prevents the edge of the bare cell 110 from being distorted by external impact. In one embodiment, double-sided tape 181 is provided between the supplementary case 180 and the bare cell 110 to attach the supplementary case 180 to the bare cell 110. In addition, an outer surface of the supplementary case 180 is surrounded by the label 160, and thus a coupling strength of the supplementary case to the bare cell 110 is increased.

As described above, in the battery pack 100, an increase in contact resistance between the bare cell 110 and the protection circuit 120 is prevented or significantly reduced by the elastic region 137 formed in the coupler 130, and thus reliability is improved. In addition, the battery pack 100 includes a coupler 130 to substantially prevent an increase in contact resistance between the protection circuit 120 and the bare cell 110, thereby, increasing reliability. Further, the protection circuit 120 and the cover 150 are combined by the fastener 140, thus improving assembly efficiency of the battery pack.

With reference now to FIGS. 2A to 2D, a battery pack 200 according to another embodiment of the present invention includes a bare cell 110, a protection circuit 120, a coupler 230 and a fastener 140. In addition, the battery pack 200 further includes a cover 150, a label 160, an elastic pad 170, and a supplementary case 180.

Explanation about the above-described elements will be omitted in the present embodiment and only the coupler 230 will be described in detail.

Figure 2A:
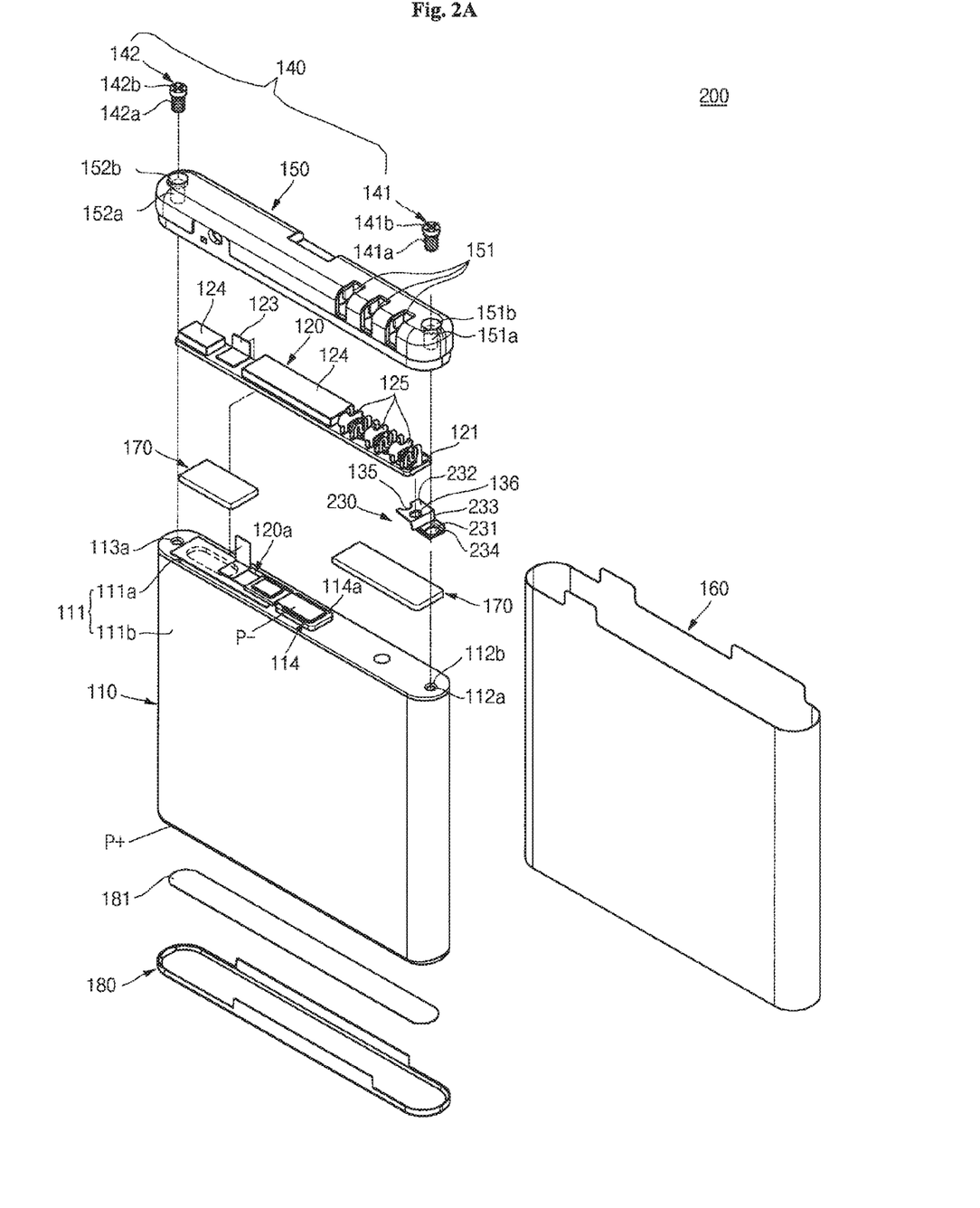
FIG. 2A is an exploded perspective view of a battery pack according to another embodiment of the present invention.
Figure 2B:
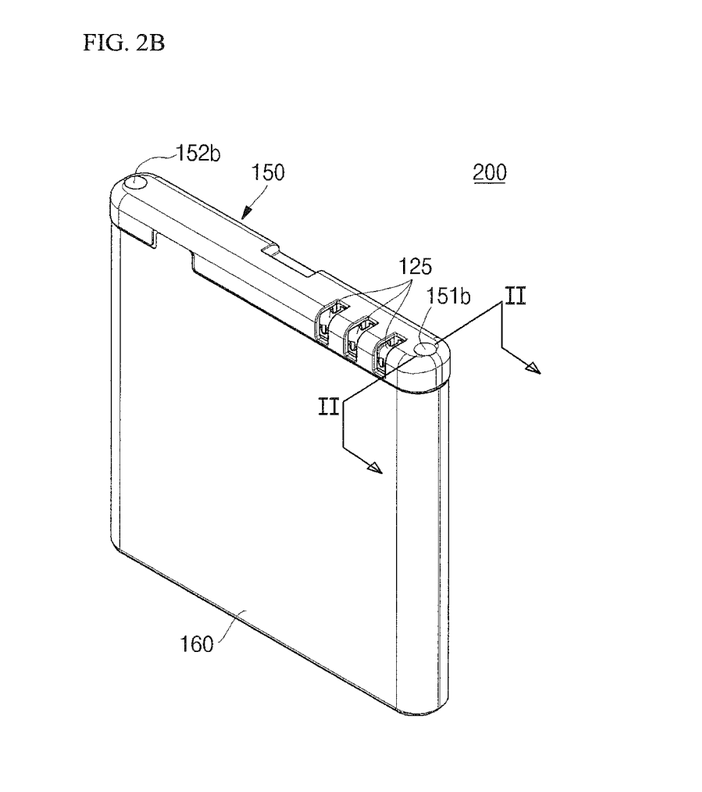
FIG. 2B is an assembled perspective view of the battery pack of FIG. 2A.

The coupler 230 includes a first region 232, a second region 233 and a third region 234. The shape and coupling of the first and second regions 232, 233 is substantially similar as explained with reference to FIG. 1F and therefore explanation about these elements will be omitted.

Figure 2C:
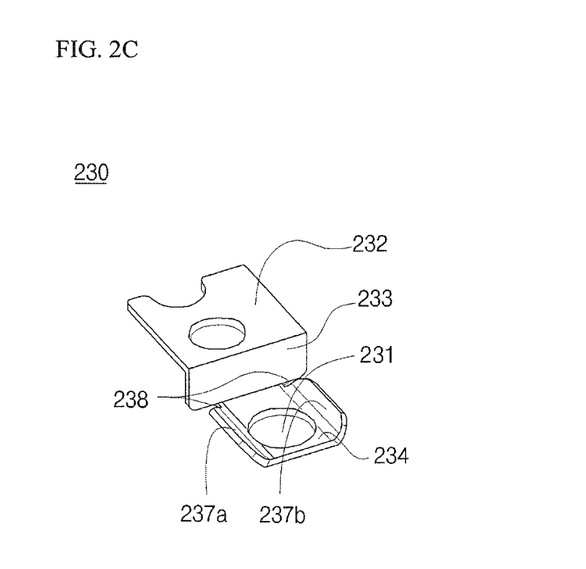
FIG. 2C is a detailed perspective view illustrating a coupler according to one embodiment of the present invention.

The third region 234 of the coupler 230 extends from the second region 233 away from the first region 232. In addition, a coupling hole 231 is formed in the third region 234 configured to receive a body 141a of a first fastener 141 therethrough. The third region 234 is provided with an elastic region that may apply force to the bare cell 110, the elastic region being formed by a pair of wings 237a, 237b.

Referring to FIG. 2C, a first wing 237a and a second wing 237b are bent upward from either side of the coupler 230. The first and second wings 237a, 237b may be symmetrical about the third region 234.

Figure 2D:
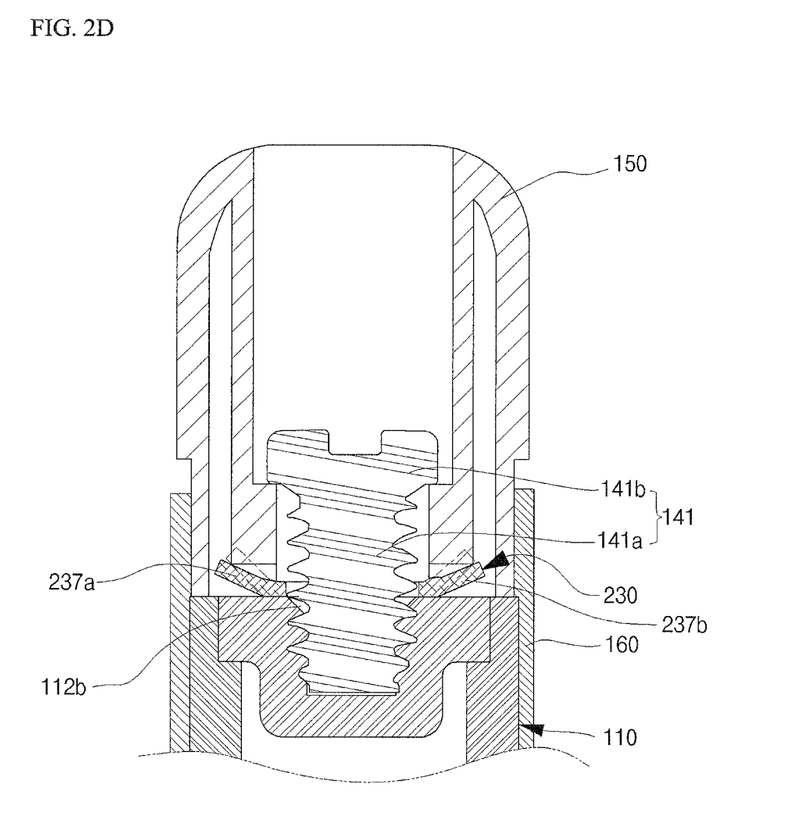
FIG. 2D is a partial cross-sectional view taken along 'II-II' line of the battery pack of FIG. 2B.

In addition, referring to FIG. 2D, the first and second wings 237a, 237b contact and elastically support the cover 150 when the bare cell 110 is combined with the cover 150, thereby improving a coupling strength of the first fastener 141 to the bare cell 110. Accordingly, in the battery pack 200, an increase in contact resistance between the coupler 230 and the bare cell 110 is substantially prevented upon external impact.

In one embodiment, the first and second wings 237a, 237b are bent at an angle of from about 15° to 75° with respect to the coupling hole 231 for supporting the first fastener 141 and the bare cell 110 elastically.

Referring to FIG. 2C, the coupler 230 is provided with a notch 238 in the third region 234. The notch 238 is formed to allow easier bending of the third region 234 with respect to the second region 233. The notch 238 may be formed on either side of the third region 234 proximate where the second and the third regions 233, 234 contact each other.

In addition, when the cover 150 contacts the third region 234, the third region 234 may become slightly depressed or deformed to support the bare cell 110 and the cover 150 elastically. The depression of the third region 234 concentrates force such as torsion on a contact surface of the first region 232 soldered to the protection circuit 120, thus potentially causing the first region 232 to separate from the protection circuit 120. When the notch 238 is provided, flexibility of the third region 234 increases, thereby substantially preventing the transmission of elastic force of the third region 234 to the first and second regions 232, 233, and substantially preventing the concentration of forces such as torsion on the first region 232. In other words, in the battery pack, the coupling between the coupler and the protection circuit 120 may be maintained even upon external impact, thereby substantially preventing an increase in contact resistance.

Referring now to FIGS. 3A to 3D, the battery pack 300 according to still another embodiment of the present invention includes a bare cell 110, a protection circuit 120, a coupler 330 and a fastener 140, as described above. In addition, the battery pack 300 further includes a cover 150, a label 160, an elastic pad 170, and a supplementary case 180.

Explanation about the above-described elements will be omitted in the embodiment and only the coupler 330 will be described in detail.

Figure 3A:
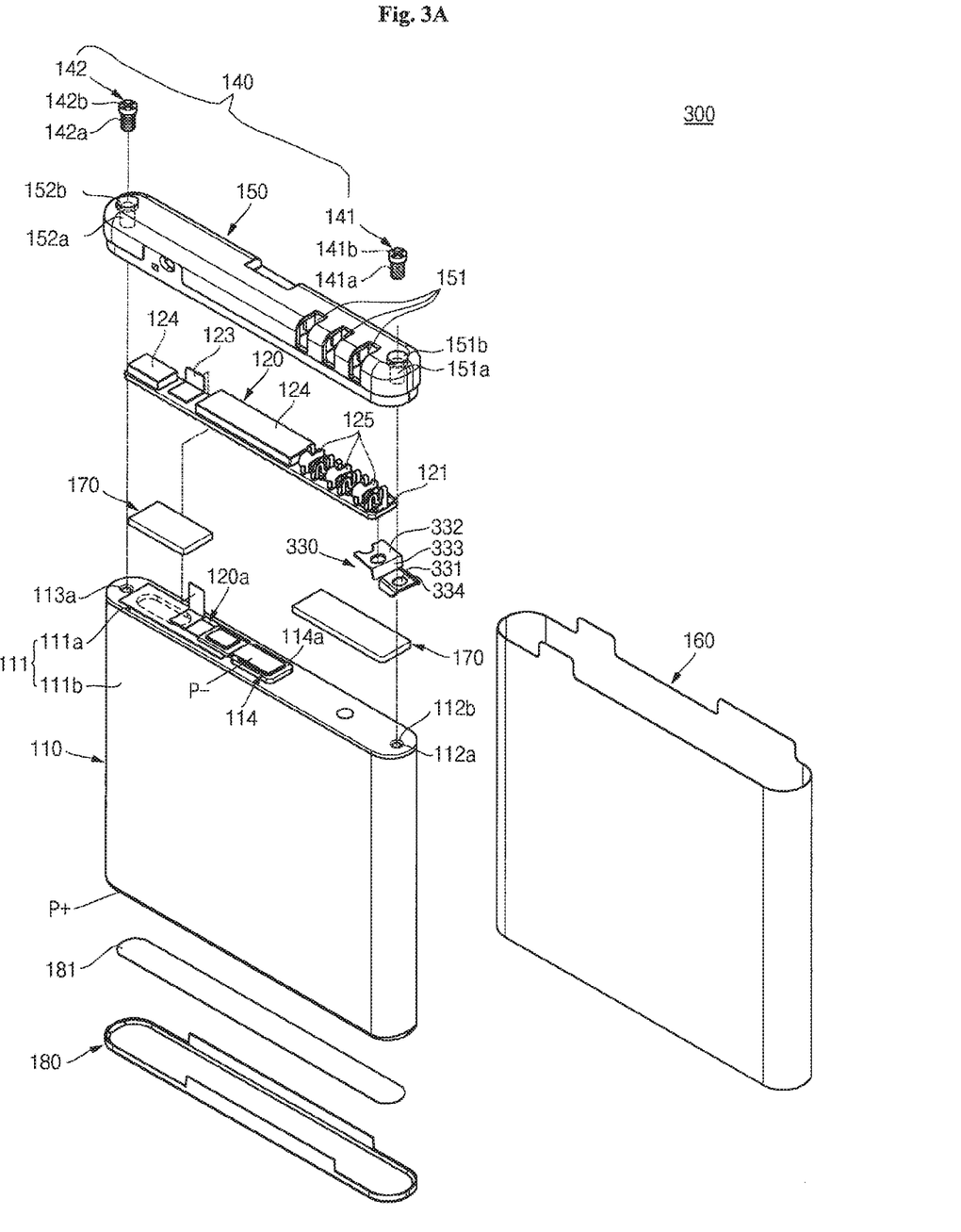
FIG. 3A is an exploded perspective view illustrating a battery pack according to still another embodiment of the present invention.
Figure 3B:
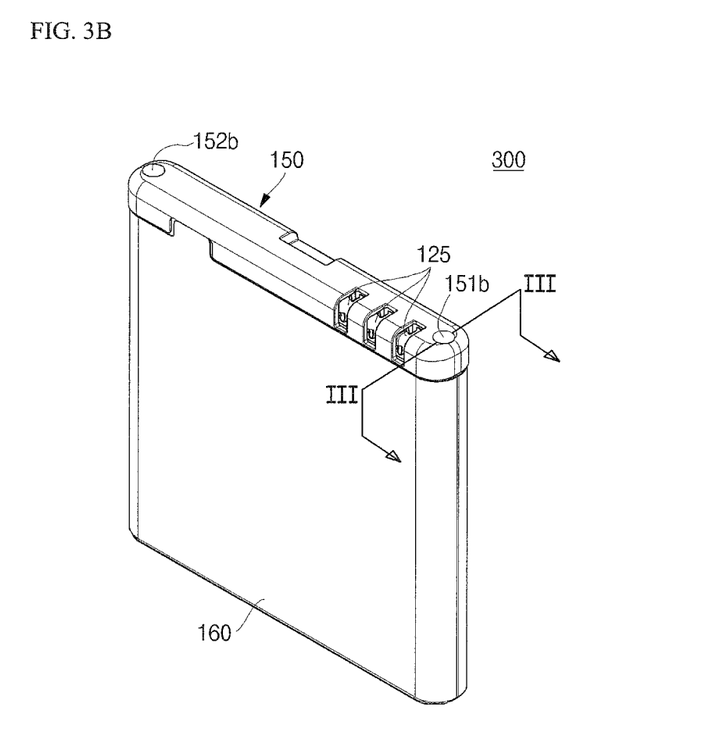
FIG. 3B is an assembled perspective view of the battery pack of FIG. 3A.

The coupler 330 includes a first region 332, a second region 333 and a third region 334. The shape and coupling of the first and second regions 332, 333 is substantially the same as with reference to FIG. 1F, and overlapping explanation thereof will be omitted.

Figure 3C:
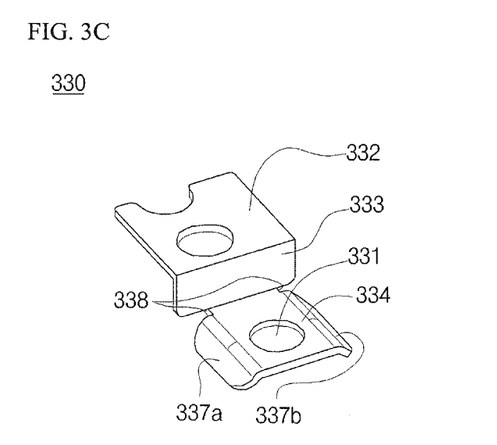
FIG. 3C is a detailed perspective view illustrating a coupler according to an embodiment of the present invention.

The third region 334 of the coupler 330 extends from the second region 333 away from the first region 332. In addition, the third region 334 is provided with a coupling hole 331 configured to receive a body 141a of the first fastener 141 therethrough. In addition, the third region 334 is forced against the bare cell 110 by an elastic region. The elastic region may be formed by a pair of wings 337a, 337b.

Referring to FIG. 3C, a first wing 337a and a second wing 337b are formed by bending both sides of the coupler 330 away from the first portion 332. In one embodiment, the first and second wings 337a, 337b are formed symmetrically about the third portion 334. In addition, the first and second wings 337a, 337b may be bent at an angle from about 15° to 75° with respect to the coupling hole 331. In other words, the wing 337 of the coupler 330 of the FIG. 3C extends in an opposite direction to the wing 237 described with reference to FIG. 2C.

Figure 3D:
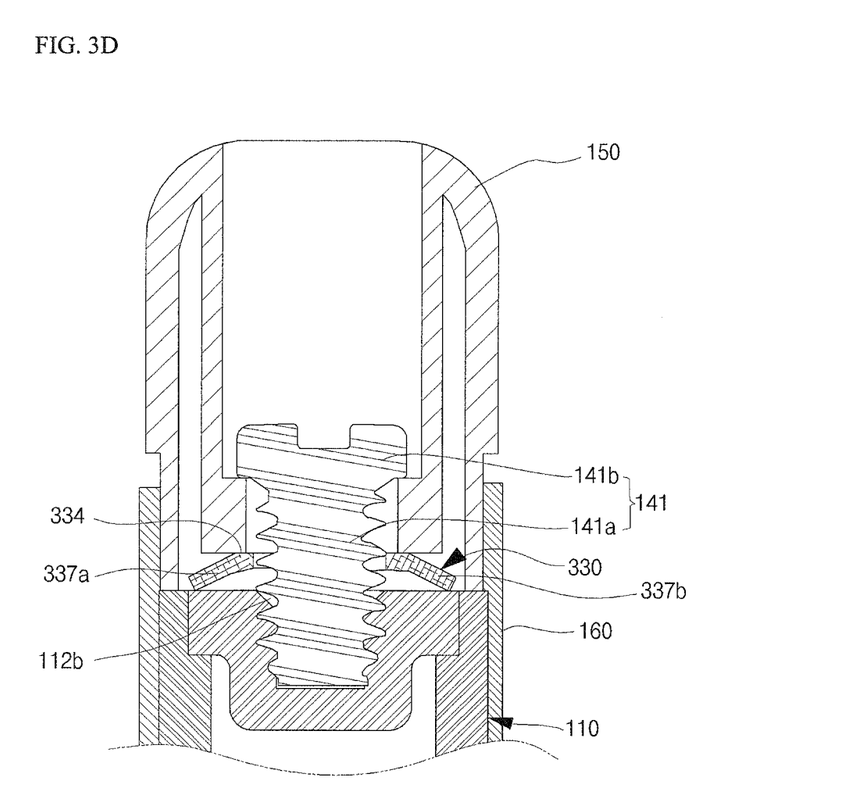
FIG. 3D is a partial cross-sectional view taken along 'III-III' line of the battery pack of FIG. 3B.

Referring to FIG. 3D, when the coupler 330 is combined with the bare cell 110 and the cover 150, the first and second wings 337a, 337b are forced against an upper surface of the bare cell 110. The cover 150 is pressed against the third region 334 of the coupler 330. Accordingly, the third region 334 elastically supports the cover 150 and the bare cell 110, thereby improving a coupling strength of the first fastener 140 to the bare cell 110. Accordingly, in the battery pack 300, an increase in the contact resistance between the coupler 330 and the bare cell 110 may substantially prevented even upon external impact.

As described above, the battery pack according to the present invention may produce the following effects.

First, the battery pack may substantially prevent an increase in the contact resistance between the bare cell and the protection circuit upon external impact, thereby improving the reliability.

Second, the battery pack may improve assembly efficiency of the battery pack.

It will be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A battery pack, comprising:
a bare cell comprising an outer surface including a coupling groove;
a protection circuit electrically coupled to the bare cell and comprising a surface facing the outer surface of the bare cell;
a coupler electrically coupled between the bare cell and the protection circuit, the coupler comprising a first region including a first surface facing and attached to the surface of the protection circuit, a third region defining a coupling hole and including a second surface contacting the bare cell, and a second region between and generally perpendicular to the first region and the third region;
a fastener adapted to couple to the coupling groove through the coupling hole; and
an elastic pad between and contacting the surface of the protection circuit and the outer surface of the bare cell, the elastic pad and the coupler each having a same height equal to a distance between the surface of the protection circuit and the outer surface of the bare cell,
wherein the third region of the coupler comprises an elastic region for elastically supporting the fastener and the bare cell.

2. The battery pack of claim 1, wherein the elastic region extends at an acute angle from a plane defined by the coupling hole.

3. The battery pack of claim 1, wherein the elastic region is divided into a first elastic region and a second elastic region by a slit extending from the coupling hole, the first elastic region extending generally toward the protection circuit.

4. The battery pack of claim 3, wherein the second elastic region extends generally away from the protection circuit.

5. The battery pack of claim 1, wherein the coupler defines a soldering notch at a region where the coupler contacts the protection circuit.

6. The battery pack of claim 1, wherein the coupler defines a soldering hole at a region where the coupler contacts the protection circuit.

7. The battery pack of claim 1, wherein an opening of the coupling groove defines a burr prevention region having a diameter greater than a diameter of the coupling groove.

8. The battery pack of claim 7, wherein the diameter of the burr prevention region is from about 10% to 30% greater than the diameter of the coupling groove.

9. The battery pack of claim 7, wherein the burr prevention region is defined by a chamfered portion of the coupling groove.

10. The battery pack of claim 1, wherein a diameter of the coupling groove tapers along a depth of the coupling groove.

11. The battery pack of claim 1, wherein the coupling groove comprises a first coupling groove and a second coupling groove, wherein the fastener comprises a first fastener and a second fastener combined with the first coupling groove and the second coupling groove, respectively, and wherein the coupler is combined with the first fastener.

12. The battery pack of claim 1, wherein the elastic pad cushions the protection circuit.

13. The battery pack of claim 1, further comprising a cover surrounding the protection circuit, the cover including at least one seating groove defining a through hole, wherein the fastener is seated on the at least one seating groove and extends into the through hole.

14. The battery pack of claim 13, wherein the cover contacts the elastic region of the coupler.

15. The battery pack of claim 1, wherein
the third region extends in a direction opposite from the first region.

16. The battery pack of claim 15, wherein the third region defines a notch proximate to the second region.

17. The battery pack of claim 1, wherein the elastic region is defined by at least one wing extending at an acute angle from a plane defined by the third region.

18. The battery pack of claim 17, wherein the at least one wing comprises a first wing on a first side of the coupling hole and a second wing on a second side opposite the first side of the coupling hole.

* * * * *